United States Patent
Jiang et al.

(10) Patent No.: US 7,298,547 B1
(45) Date of Patent: Nov. 20, 2007

(54) 2-μM FIBER AMPLIFIED SPONTANEOUS EMISSION (ASE) SOURCE

(75) Inventors: Shibin Jiang, Tucson, AZ (US); Jianfeng Wu, Tucson, AZ (US); Jihong Geng, Tucson, AZ (US)

(73) Assignee: NP Photonics Inc., Tucson, AZ (US)

( * ) Notice: Subject to any disclaimer, the term of this patent is extended or adjusted under 35 U.S.C. 154(b) by 0 days.

(21) Appl. No.: 11/517,164

(22) Filed: Sep. 7, 2006

(51) Int. Cl.
 *H01S 3/00* (2006.01)
(52) U.S. Cl. ........................... 359/341.1; 372/6
(58) Field of Classification Search ......... 359/341.1
 See application file for complete search history.

(56) References Cited

U.S. PATENT DOCUMENTS

| | | | |
|---|---|---|---|
| 6,556,342 B1 * | 4/2003 | Ellison et al. | 359/334 |
| 6,667,257 B2 * | 12/2003 | Cole et al. | 501/37 |
| 6,757,474 B2 * | 6/2004 | Anderson et al. | 385/142 |
| 7,106,762 B1 * | 9/2006 | Jiang et al. | 372/6 |
| 2003/0147619 A1 * | 8/2003 | Anderson et al. | 385/142 |
| 2003/0234978 A1 * | 12/2003 | Garito et al. | 359/341.5 |
| 2006/0050367 A1 * | 3/2006 | Yamada et al. | 359/341.1 |

OTHER PUBLICATIONS

Kyunghawan-Oh; Kilian-A; Reinhart-L; Quin-Zhang; Morse-Tf; Weher-Pm, Broadband superfluorescent emission of the 3H4 to 3H6 transition in a Tm-doped multicomponent silicate fiber, Optics Letters, Aug. 1, 1994; 19(15): 1131-3.

Tsang-Yh; King-Ta; Do-Kyeong-Ko; Jongmin-Lee, "Broadband amplified spontaneous emission double-clad fibre source with central wavelengths near 2um," Journal of Modern Optics. May 10, 2006; 53(7): 991-1;001.

* cited by examiner

*Primary Examiner*—Deandra M Hughes
(74) *Attorney, Agent, or Firm*—Eric A. Gifford

(57) ABSTRACT

A 2-μm fiber Amplified Spontaneous Emission (ASE) source provides a wide emission bandwidth and improved spectral stability/purity for a given output power. The fiber ASE source is formed from a heavy metal oxide multicomponent glass selected from germanate, tellurite and bismuth oxides and doped with high concentrations, 0.5-15 wt. %, thulium oxides ($Tm_2O_3$) or 0.1-5 wt% holmium oxides ($Ho_2O_3$) or mixtures thereof. The high concentration of thulium dopants provide highly efficient pump absorption and high quantum efficiency. Co-doping of Tm and Ho can broaden the ASE spectrum.

13 Claims, 6 Drawing Sheets

| Host Glass | Host | Modifier (MO) | Intermediator (XO) | Thulium Oxide | Holmium Oxide |
|---|---|---|---|---|---|
| Germanate ($GeO_2$) | (30-90 wt. %), (40-80 wt. %) | (1-60 wt. %) (5-40 wt. %) | (0-50 wt. %) (5-30 wt. %) | 0.5 ~ 15wt% 1~8wt% | 0.1~5 wt% 0.2 ~ 3wt% |
| Tellurite ($TeO_2$) | (30-90 wt. %), (40-80 wt. %) | (1-60 wt. %) (5-40 wt. %) | (0-50 wt. %) (5-30 wt. %) | 0.5 ~ 15wt% 1~8wt% | 0.1~5 wt% 0.2 ~ 3wt% |
| Bismuth ($Bi_2O_3$) | (20-90 wt. %), (30-70 wt. %) | (1-60 wt. %) (5-40 wt. %) | (0-50 wt. %) (5-30 wt. %) | 0.5 ~ 15wt% 1~8wt% | 0.1~5 wt% 0.2 ~ 3wt% |

| Name | Glass Composition (Weight %) | | | | |
|---|---|---|---|---|---|
| | GeO$_2$ | Al$_2$O$_3$ | BaO | Na$_2$O | Tm$_2$O$_3$ |
| CG-S-1 | 61.7 | 7.4 | 17.3 | 6.7 | 7.0 |
| CG-S-3 | 61.8 | 7.4 | 17.3 | 6.7 | 6.8 |
| CG-S-4 | 66.0 | 7.9 | 18.5 | 7.2 | 0.5 |
| CG-S-5 | 65.7 | 7.8 | 18.4 | 7.1 | 1.0 |
| CG-S-6 | 65.0 | 7.7 | 18.2 | 7.1 | 2.0 |
| CG-S-7 | 63.7 | 7.6 | 17.8 | 6.9 | 4.0 |
| CG-S-8 | 62.3 | 7.4 | 17.4 | 6.8 | 6.0 |
| CG-S-9 | 61.0 | 7.3 | 17.1 | 6.6 | 8.0 |
| CG-S-10 | 59.7 | 7.1 | 16.7 | 6.5 | 10.0 |
| CG-S-17 | 61.7 | 7.3 | 17.3 | 6.7 | 7.0 |
| CG-S-18 | 62.4 | 7.4 | 17.5 | 6.8 | 5.9 |
| CG-S-19 | 62.4 | 7.4 | 17.5 | 6.8 | 5.9 |
| CG-S-20 | 62.4 | 7.4 | 17.5 | 6.8 | 5.9 |
| CGS-21 | 62.4 | 7.4 | 17.5 | 6.8 | 5.9 |
| CGS-22 | 62.4 | 7.4 | 17.5 | 6.8 | 5.9 |
| CGS-23 | 62.4 | 7.4 | 17.5 | 6.8 | 5.9 |

FIG. 6

2-µM FIBER AMPLIFIED SPONTANEOUS EMISSION (ASE) SOURCE

GOVERNMENTAL RIGHTS

This invention was made with Government support under Contracts NNL05AA13C and NNL06AA11C awarded by NASA. The Government has certain rights in this invention.

BACKGROUND OF THE INVENTION

1. Field of the Invention

This invention relates to a 2-µm fiber Amplified Spontaneous Emission (ASE) source.

2. Description of the Related Art

Fiber ASE sources are broadband light sources based on the emission properties dictated by the energy structure of dopant ions in the glass host. A pump laser energizes the dopant ions so that spontaneously emitted light from one ion propagates along the fiber where it is amplified by the gain properties of the fiber and emitted as ASE. Light is emitted in both forward and backward directions, relative to pump direction, but the backward ASE, or counter-pumped direction, has a higher quantum efficiency and is selected as the source output. Unlike lasers, ASE sources do not rely on optical feedback, and thus the full-width half-maximum (FWHM) bandwidth of the backward ASE is generally very broad, typically greater than 10 nm.

ASE sources are widely used for test and measurement in such fields as optical spectroscopy of materials, optical component testing, optical coherence tomography, and optical fiber gyroscopes. The incoherent light source enables measurement of insertion loss, crosstalk, bandwidth, polarization dependencies, and other parameters of passive optical components versus wavelength. The most common fiber ASE source comprises a single-mode pump that energizes a length of Er-doped single-mode silica fiber, typically tens of meters, to emit at 1.5 µm. In these ASE sources there is a tradeoff between (1) power and (2) emission bandwidth and spectral stability/purity.

Kyunghwan Oh et al demonstrated the first near 2 micron ASE from $Tm^{3+}$-doped silica fiber. The core glass of the fiber is a silica composition of at least 93 mol. % silica with 3.9 mol. % $Ta_2O_5$, 2.3 mol. % $Al_2O_3$, and 0.2 mol. % $P_2O_5$ that does not include a glass modifier. (Kyunghwan-Oh; Kilian-A; Reinhart-L; Qin-Zhang; Morse-TF; Weher-PM, "Broadband superfluorescent emission of the $^3H_4$ to $^3H_6$ transition in a Tm-doped multicomponent silicate fiber," Optics-Letters, 1 Aug. 1994; 19(15): 1131-3). Near 2 micron ASE from double clad $Tm^{3+}$-doped silica fiber and Tm:Ho doped fluoride fibers using a high power 803 nm diode pump source were demonstrated by Yuen H. Tsang, et al. (Tsang-YH; King-TA; Do-Kyeong-Ko; Jongmin-Lee, "Broadband amplified spontaneous emission double-clad fibre source with central wavelengths near 2 µm," Journal-of-Modern-Optics. 10 May 2006; 53(7): 991-1001). D shaped Tm-doped silica fiber, rectangular Tm-doped silica fiber, and rectangular Tm:Ho doped ZBLAN fluoride glass fiber were used for the demonstration. The Tm doping concentrations in the Tm only silica fiber are 1.6 wt % and 1.45 wt %.

SUMMARY OF THE INVENTION

The present invention provides a 2-µm fiber Amplified Spontaneous Emission (ASE) source that provides a wider emission bandwidth and improved spectral stability/purity for a given output power.

This is accomplished with a fiber ASE source formed from a heavy metal oxide multicomponent glass selected from germanate, tellurite and bismuth oxides and doped with high concentrations, 0.5-15 wt. %, thulium oxides ($Tm_2O_3$) or 0.1-5 wt % holmium oxides ($Ho_2O_3$) or mixtures thereof. The high concentration of thulium dopants provide highly efficient pump absorption and high quantum efficiency. Co-doping of Tm and Ho can broaden the ASE spectrum.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 6 is a table of glass samples for a Tm-doped germanate glass;

DETAILED DESCRIPTION OF THE INVENTION

The present invention provides a broadband 2-µm fiber ASE source with a high level of power and spectral stability that covers wavelengths from approximately 1.7 micron to approximately 2.1 micron. The fiber ASE source is formed from a multicomponent heavy metal oxide glass selected from germanate, tellurite and bismuth oxides and doped with high concentrations, 0.5-15 wt. %, thulium oxides ($Tm_2O_3$) or 0.1-5 wt % holmium oxides ($Ho_2O_3$) or mixtures thereof. The high concentration of thulium dopants provide highly efficient pump absorption and high quantum efficiency. Co-doping of Tm and Ho can broaden the ASE spectrum.

Fiber ASE Source

Figure 1:
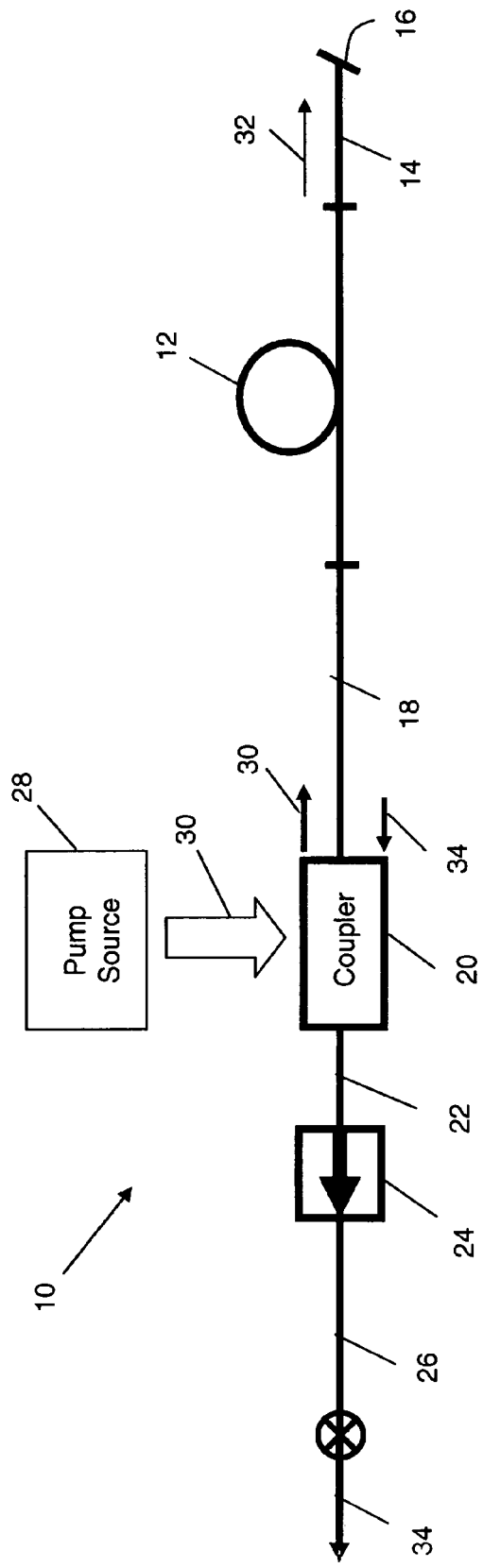
FIG. 1 is a diagram of a 2-µm fiber ASE source in accordance with the present invention.

As shown in FIG. 1, an exemplary fiber ASE source 10 includes a length, suitably 1 cm-20 m, of single-mode gain fiber 12 formed from Tm or Ho-doped or Tm:Ho co-doped heavy metal oxide multicomponent glass. The fiber includes a doped-core and one or more undoped cladding layers. One end of the gain fiber is spliced to a length of fiber 14 whose open end 16 is angle cleaved and possibly immersed in index-matching gel. The other end of the gain fiber is spliced to a length of fiber 18 connected to a pump coupler 20 such as a thin-film WDM, fused fiber or TIR coupler (see US Pat. No. 6,529,318). The pump coupler is connected to fiber 22, an isolator 24, and an output fiber 26. All of the fibers except the gain fiber are suitably undoped single-mode silica fiber such as Corning SMF28.

Figure 2:
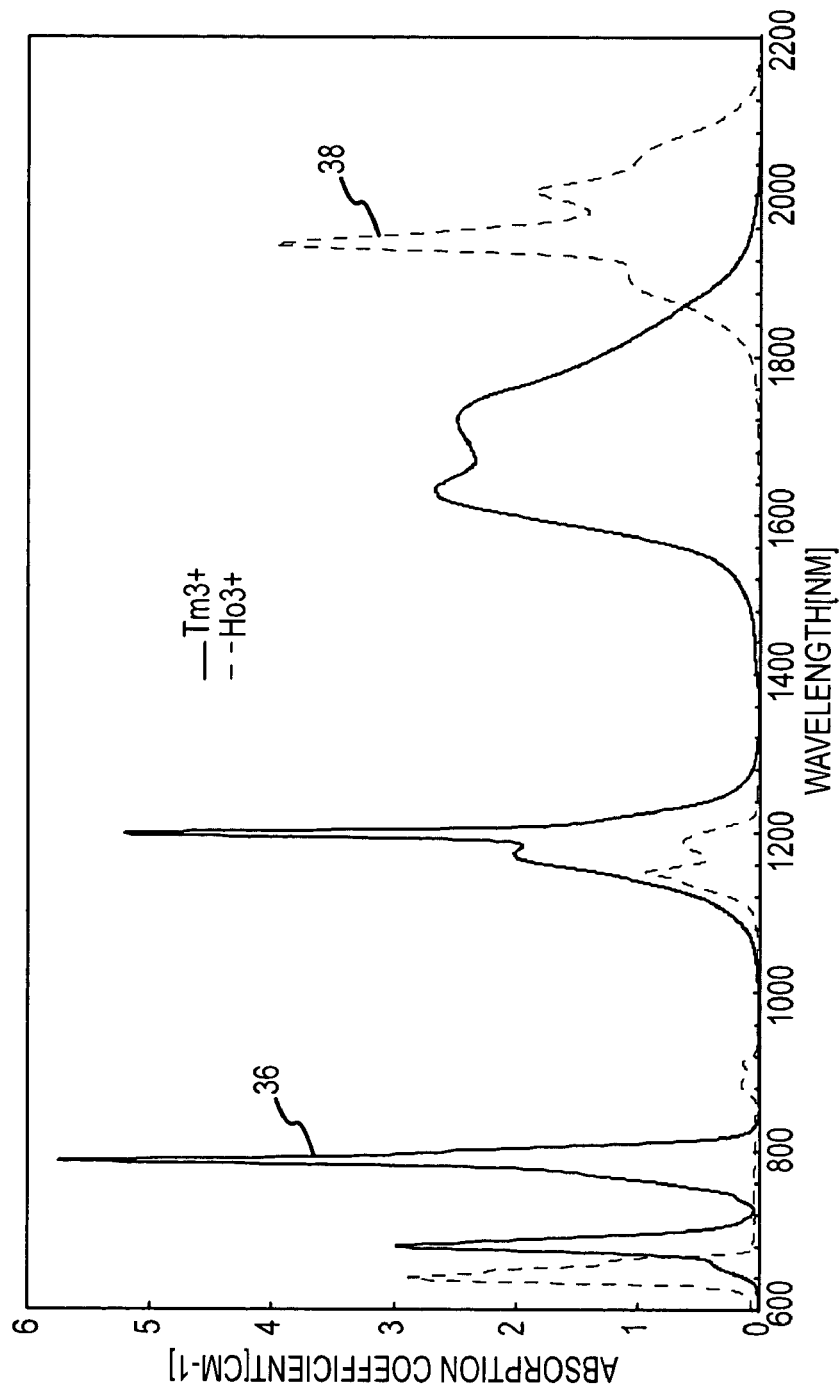
FIG. 2 is a plot of the absorption spectra of thulium and holmium doped glasses, respectively.

A pump source 28, e.g. a single-mode or multi-mode pump diode, emits a pump signal 30 that is coupled into the fiber chain through pump coupler 20 and propagates in the fiber where it is absorbed by and excites the thulium and/or holmium dopant ions in the fiber core to produce spontaneous emission. As shown in FIG. 2, the absorption band 36 of triply ionized thulium occurs from 750 to 820 nm. The pump wavelength can be around 1.2 μm and 1.7 μm to excite Thulium from $^3H_6$ state to $^3H_5$ and $^3F_4$ levels. The absorption band 38 of triply ionized holmium occurs from 1800 to 2100 nm. The pump wavelength can be around 1800 nm and 2100 nm to excite Holmium from $^5I_8$ to $^5I_7$ levels. Typically one excites thulium ions, which in turn transfers energy to the holmium ions. The pump wavelength can also be shifted to other wavelengths to excite Yb and Er when these ions are doped into the host. Pumping of the doped glass populates the thulium upper level creating a population inversion. Spontaneous emission catalyzes the stimulated emission of the thulium (holmium) ions in the upper level over a range of 1800 to 2000 nm (1900 to 2200 nm). The emission peak of thulium (holmium) occurs at a wavelength of approximately 1800 nm (2080 nm).

The gain fiber should be sufficiently long to allow for the build-up of ASE and short enough to maintain adequate pumping to avoid unwanted propagation loss. The ASE source output power is emitted in two directions, one of which is not used. The unwanted forward ASE 32 is attenuated by the last few centimeters of gain fiber 12, which are not efficiently pumped and thus function as an attenuator. The angle cleave at end 16 of fiber 14 allows the forward ASE to exit the fiber without introducing reflection of power back into the fiber. In an alternate embodiment, fiber 14 can be omitted and the end of the gain fiber angle cleaved. The backward ASE 34 propagates through the fiber chain to fiber 26 where it is emitted from the source. Isolator 24 prevents reflections of ASE power from returning into the ASE fiber. A double-pass ASE source would be very similar except a reflector would be formed at end 16 and the gain fiber length would be somewhat shorter to avoid attenuation of the forward ASE.

Figure 3:
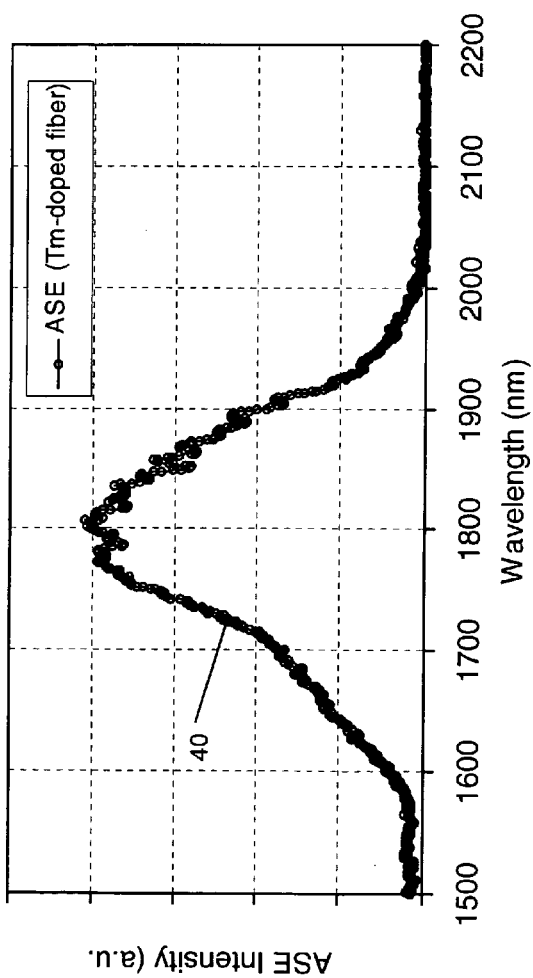
FIG. 3 is a plot of the emission spectra for Thulium doped germanate glass fiber for conventional backward pumping.
Figure 4:
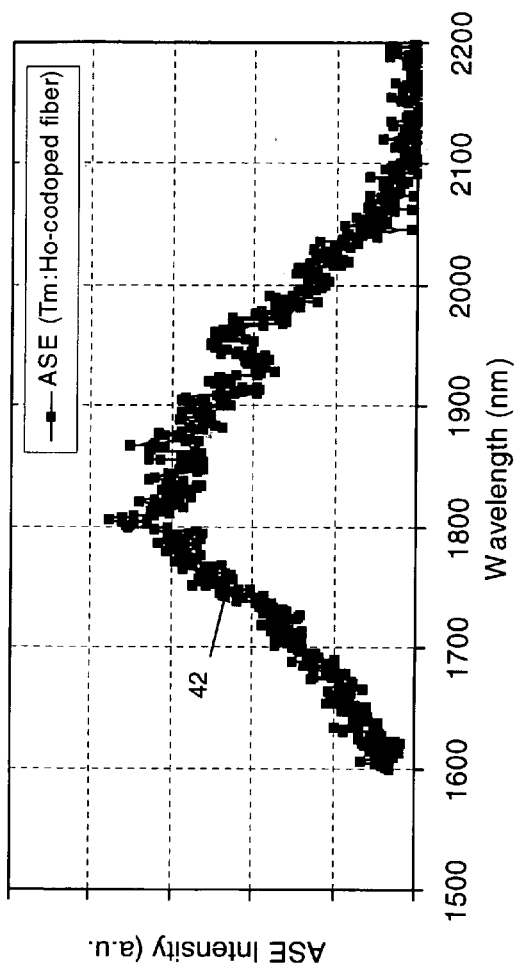
FIG. 4 is a plot of the emission spectra for Thulium-Holmium co-doped germanate glass fiber for conventional backward pumping.

Using this conventional backward pumping geometry, the ASE source can achieve fairly wide bandwidths, typically 1700-2100 nm center near 1800-1850 nm. As shown in FIG. 3, the emission spectrum 40 of the fiber ASE source using Tm-doped germanate glass fiber lies between 1700 and 1900 nm and is centered near 1800 nm for Thulium only doping. As shown in FIG. 4, a Tm:Ho co-doped fiber produces an emission spectrum 42 centered near 1850 nm and covering 1700 nm to approximately 2000 nm.

To increase the bandwidth and improve the spectral shape, a number of different pumping configurations and ASE architectures can be used. To increase output power, the gain fiber may be pumped from both ends in a "dual-pumping" configuration or pumped with a multi-mode pump. In the former case, the second pump would be positioned at end 16 of fiber 14 and in the latter case the fibers would have multiple claddings in which to confine the propagating pump signal. To extend the bandwidth, the forward ASE of a second pumped gain fiber can be used to seed the gain fiber. Alternately, gain fiber 12 may comprise a concatenation of multicomponent oxide fiber segments with varying length and varying combinations and/or concentrations of dopants that extends the bandwidth. Filters such as spectral shaping filters or gain flattening filters can be inserted in the fiber chain at open end 16 or after isolator 24 to provide the desired output spectrum, e.g. Gaussian.

Tm-doped, Ho-doped and Tm/Ho co-doped Heavy Metal Oxide Multicomponent Glass

Heavy metal oxide glasses and fibers are doped with a high concentration of thulium ions or co-doped with thulium and holmium. Heavy metal oxide glasses such as germanate, tellurite and bismuth oxide exhibit low phonon energy. The quantum efficiency of upper level thulium ions and holmium ions is high when compared to high phonon energy glasses such as phosphate glass and borate glass. Critically, thulium can be highly doped into these heavy metal oxide glasses. At these high dopant concentrations, the cross-relaxation phenomenon dramatically improves the quantum efficiency. For instance, germanate glass exhibits phonon energy of 900 $cm^{-1}$, which is much lower than silica glass of 1100 $cm^{-1}$. The doping concentration of thulium and/or holmium ions in germanate glass can be up to 15 weight percent. In addition to high quantum efficiency, these glasses exhibit good mechanical properties and can be pulled into fibers.

Figure 5:
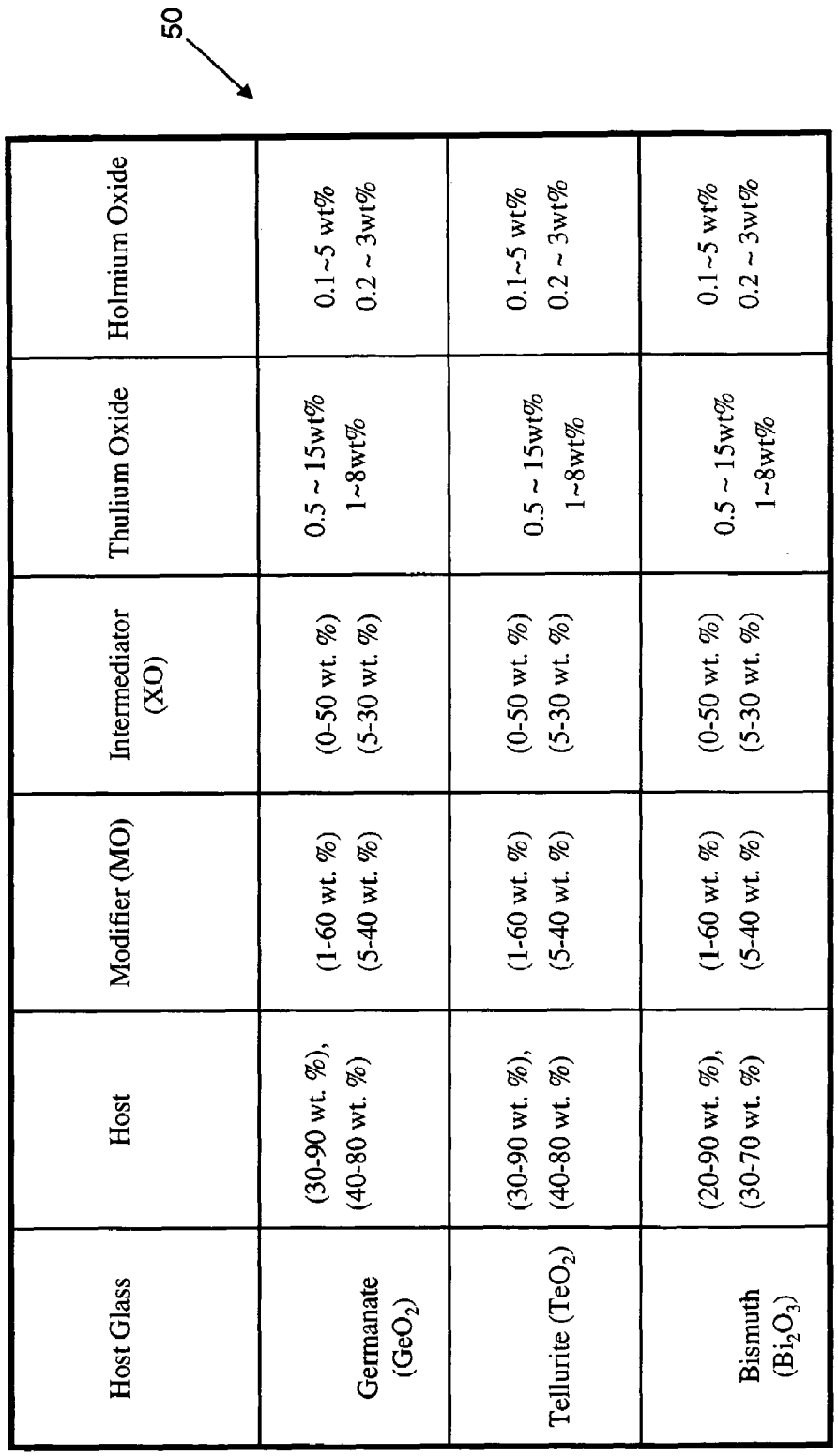
FIG. 5 is a table of Germanate, Tellurite and Bismuth heavy metal oxide multicomponent glasses and the Thulium and/or Holium oxide doping concentrations.

As shown in a glass table 50 in FIG. 5, a heavy metal oxide glass host selected from germanate glass, tellurite glass and bismuth glass is heavily doped with Thulium ions, suitably 0.5 to 15 wt %, and preferably 1 to 8 wt % to increase quantum efficiency and absorb pump power. The concentration of Thulium ions is high enough that most energy will be transferred to the lasing up-level of $^3F_4$ by cross-relaxation energy transfer when thulium only doped. The quantum efficiency is preferably at least 100%, and most preferably at least 150% when it is pumped with near 800 nm laser. When the glass is doped with holmium only, suitable doping concentration is from 0.1 to 5 wt %, and preferably from 0.2 to 3 wt %. When thulium and holmium ions are co-doped, suitable doping is 0.5 to 15 wt % for thulium oxide and 0.1 to 5 wt % for holmium oxide, and preferably from 1 to 8 wt % for thulium oxide and 0.2 to 3 wt % for holmium oxide. Thulium ions and holmium can be also introduced into glasses and fibers with Thulium fluoride or other format. The ion concentration per volume should be similar.

In one embodiment, a germanate glass host comprises germanium oxide ($GeO_2$) from 30% to 90% by weight, and preferably 40% to 80% by weight. Glass table 60 in FIG. 6 lists a number of glass sampled for a Tm-doped germanate glass. Sample CG-S-23 with 5% $Tm_2O_3$ and 4% $Tm_2O_3$ and 0.75% $Ho_2O_3$ was used to generate the emission spectra shown in FIGS. 3 and 4, respectively.

In a second embodiment, a tellurite glass host comprises tellurium oxide ($TeO_2$) from 30% to 90% by weight, and preferably 40% to 80% by weight.

In a third embodiment, a bismuth glass host comprises bismuth oxide ($Bi_2O_3$) from 20% to 90% by weight, and preferably 30% to 70% by weight.

In each embodiment, the glass host further comprises a glass network modifier (MO) selected from $K_2O$, $Na_2O$, $Li_2O$, BaO, CaO, MgO, ZnO, $Y_2O_3$, PbO, or combinations thereof from 1% to 60% by weight, and preferably 5% to 40%, and a glass network intermediator (XO) selected from $Al_2O_3$, $B_2O_3$, $La_2O_3$ or combinations thereof from 0% to 50%, by weight, and preferably 5% to 30%.

The single-mode fibers formed from heavy metal multicomponent oxide glass have a much lower softening temperature (<700° C.) than silica (>1200° C.), which greatly simplifies the fiber drawing process but complicates the process of fusion splicing to silica fiber. Furthermore, the heavy metal oxide multicomponent glass has a larger refractive index, and thus is more sensitive to reflections at splices to conventional silica fiber. A quality fusion splice should exhibit low optical loss (<0.3 dB), low back reflection loss (<−50 dB) and good tensile strength (>100 g). A standard silica-to-silica fusion splice may degrade the heavy metal oxide multicomponent glass fiber. Instead an asymmetric process that softens only the multicomponent fiber is employed as described in U.S. Pat. No. 6,705,771 entitled "Method of Fusion Splicing Silica Fiber with Low-Temperature Multi-Component Glass Fiber". To reduce back-reflection, an angle splicing process in which the silica fiber is angle cleaved, the multi-component fiber square cleaved and a matched angle formed in-situ may be employed as described in U.S. Pat. No. 6,866,429 entitled "Method of Angle Fusion Splicing Silica Fiber with Low-Temperature Non-Silica Fiber".

Figure 7:
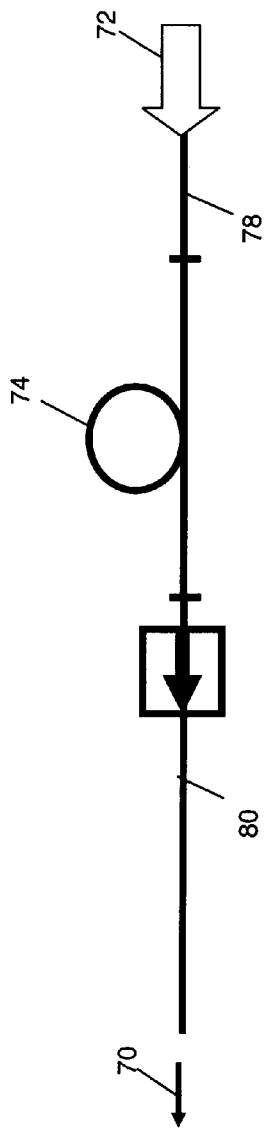
FIG. 7 is a diagram of a 2 micron fiber ASE source of forward ASE.
Figure 8:
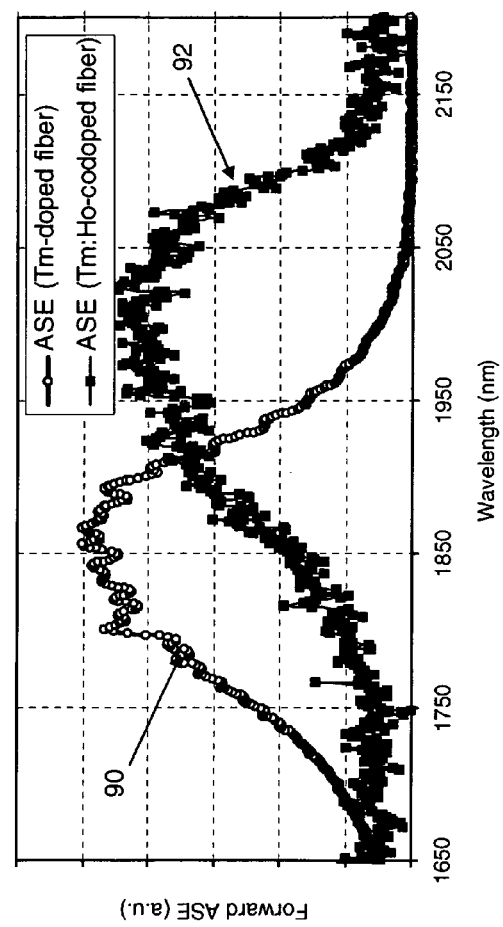
FIG. 8 is a plot of the forward ASE emission spectra of Tm-doped and Tm:Ho co-doped glass fiber.

The ASE source may be configured, as shown in FIG. 7, to emit a forward ASE 70. A pump 72 end pumps the heavy metal oxide multicomponent glass fiber 74 to generate the forward ASE 70. Isolator 76 blocks the pump from being coupled to the output and prevents reflections or other light sources from entering the ASE source. As shown the multicomponent glass fiber 74 is suitably spliced between lengths of undoped single-mode silica fiber 78, 80 such as Corning SMF28 to facilitate input coupling of the pump and output coupling of the forward ASE. The emission spectra 90, 92 of the forward ASE for a 3-cm length of Tm-doped and Tm:Ho co-doped germanate fiber pumped with a single-mode 805 nm diode laser are shown in FIG. 8.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A 2-μm amplified spontaneous emission (ASE) source, comprising:
   An optical fiber including,
      At least one cladding layer formed from a heavy metal oxide multicomponent glass host selected from one of germanium oxide ($GeO_2$), Tellurium oxide ($TeO_2$) and bismuth oxide ($Bi_2O_3$) from 20% to 90% by weight, a glass network modifier (MO) selected from $K_2O$, $Na_2O$, $Li_2O$, BaO, CaO, MgO, ZnO, $Y_2O_3$, PbO, or combinations thereof from 5% to 40% by weight, and a glass network intermediator (XO) selected from $Al_2O_3$, $B_2O_3$, $La_2O_3$ or combinations thereof from 5% to 30%, by weight; and
   A core formed from the same glass host and doped with 0.1-20 weight % of thulium or holmium oxide or mixtures thereof; and
   A pump source configured to inject optical energy into the fiber to excite the dopant oxide ions in the core and build-up and emit amplified spontaneous emission (ASE) from the fiber at wavelengths between 1.7 micron and 2.1 micron with a full-width half-maximum bandwidth of 100 nm to 300 nm.

2. The 2-μm ASE source of claim 1, wherein the glass host comprises germanium oxide ($GeO_2$) from 40% to 80% by weight.

3. The 2-μm ASE source of claim 1, wherein the core is doped with only 1-8 wt. % thulium.

4. The 2-μm ASE source of claim 1, wherein the core is doped with only 0.2-3 wt. % holmium.

5. The 2-μm ASE source of claim 1, wherein the core is co-doped with 1-8 wt. % thulium and 0.2-3 wt. % holmium.

6. A 2-μm amplified spontaneous emission (ASE) source, comprising:
   An optical gain fiber having a proximal section with a proximal end and a distal section with a distal end, said gain fiber including,
      At least one cladding layer formed from a heavy metal oxide multicomponent glass host selected from one of germanium oxide ($GeO_2$), Tellurium oxide ($TeO_2$) and bismuth oxide ($Bi_2O_3$) from 20% to 90% by weight, a glass network modifier (MO) selected from $K_2O$, $Na_2O$, $Li_2O$, BaO, CaO, MgO, ZnO, $Y_2O_3$, PbO, or combinations thereof from 5% to 40% by weight, and a glass network intermediator (XO) selected from $Al_2O_3$, $B_2O_3$, $La_2O_3$ or combinations thereof from 5% to 30%, by weight and
   A core formed from the same glass host and doped with 0.5-15 weight % of thulium oxide or 0.1-5 weight % holmium oxide or mixtures thereof; and
   A pump source configured to inject optical energy into the proximal end of the optical gain fiber to excite the dopant oxide ions in the core and provide gain in said proximal section produce to build-up backward and forward amplified spontaneous emission (ASE) in the proximal section of the gain fiber and to provide loss in said distal section,
   wherein said pump source and gain fiber are configured for backward propagation of said backward ASE through the proximal end of the fiber for emission at wavelengths between 1.7 micron and 2.1 micron with a full-width half-maximum bandwidth of 100 nm to 300 nm and for forward propagation of said forward ASE through the distal end of the fiber to attenuate the forward ASE.

7. The 2-μm ASE source of claim 6, wherein the core is co-doped with 1-8 wt. % thulium and 0.2-3 wt. % holmium.

8. The 2-μm ASE source of claim 6, wherein the glass host comprises germanium oxide ($GeO_2$) from 40% to 80% by weight.

9. The 2-μm ASE source of claim 6, wherein the pump source injects optical energy into the fiber at a wavelength of approximately 800 nm to excite the Thulium ions.

10. The 2-μm ASE source of claim 6, further comprising:
    A section of angle cleaved fiber at the distal end of the gain fiber that allows the attenuated forward ASE to exit the gain fiber without reflecting power back into the gain fiber.

11. A 2-μm amplified spontaneous emission (ASE) source, comprising:
    An optical gain fiber having a proximal section with a proximal end and a distal section with a distal end, said gain fiber including,
       At least one cladding layer formed from a heavy metal oxide multicomponent glass host selected from one of germanium oxide ($GeO_2$), tellurium oxide ($TeO_2$) and bismuth oxide ($Bi_2O_3$) from 20% to 90% by weight, a glass network modifier (MO) selected from $K_2O$, $Na_2O$, $Li_2O$, BaO, CaO, MgO, ZnO, $Y_2O_3$, PbO, or combinations thereof from 5% to 40% by weight, and a glass network intermediator (XO) selected from $Al_2O_3$, $B_2O_3$, $La_2O_3$ or combinations thereof from 5% to 30%, by weight; and
    A core formed from the same glass host and doped with 1-8 weight % of thulium oxide and 0.2-3 weight % holmium oxide or mixtures thereof; and A pump source configured to inject optical energy into the proximal end of the optical gain fiber to excite the dopant oxide ions in the core and provide gain in said proximal section to build-up backward and forward amplified spontaneous emission (ASE) in the proximal section of the gain fiber, said backward ASE propagating backward through the proximal end of the fiber for emission at wavelengths between 1.7 micron and 2.1 micron with a full-width half-maximum bandwidth of 100 nm to 300 nm, said forward ASE propagating forward through the distal end of the fiber; and A section of angle cleaved fiber at the distal end of the gain fiber that allows the forward ASE to exit the gain fiber without reflecting power back into the gain fiber.

12. The 2-µm ASE source of claim 11, wherein the section of angle cleaved fiber is a section of the optical gain fiber.

13. The 2-µm ASE source of claim 11, wherein the section of angle cleaved fiber is a section of passive silica fiber coupled to the optical gain fiber.

* * * * *